(12) United States Patent
Zhang

(10) Patent No.: US 9,976,661 B2
(45) Date of Patent: May 22, 2018

(54) BREATHER VALVE

(71) Applicant: CHONGQING BAIKE DINGYU TECHNOLOGY Co., Ltd., Congqing (CN)

(72) Inventor: Yi Zhang, Chongqing (CN)

(73) Assignee: CHONGQING BAIKE DINGYU TECHNOLOGY Co., Ltd., Chongqing (CN)

( * ) Notice: Subject to any disclaimer, the term of this patent is extended or adjusted under 35 U.S.C. 154(b) by 0 days. days.

(21) Appl. No.: 15/266,795

(22) Filed: Sep. 15, 2016

(65) Prior Publication Data

US 2017/0321817 A1  Nov. 9, 2017

(30) Foreign Application Priority Data

May 3, 2016  (CN) .......................... 2016 1 0285977

(51) Int. Cl.
  *B65D 51/16*  (2006.01)
  *F16K 15/14*  (2006.01)
  *F16K 17/19*  (2006.01)

(52) U.S. Cl.
  CPC .......... *F16K 15/147* (2013.01); *B65D 51/165* (2013.01); *F16K 17/19* (2013.01)

(58) Field of Classification Search
  CPC ....... F16K 15/00–15/147; F16K 17/00–17/19; B65D 51/00–51/165
  USPC ............. 220/202–203.29, 303; 215/260, 311
  See application file for complete search history.

(56) References Cited

U.S. PATENT DOCUMENTS

| | | | | |
|---|---|---|---|---|
| 3,552,430 | A * | 1/1971 | Love | F16K 17/00 137/495 |
| 5,125,897 | A * | 6/1992 | Quinn | A61J 15/0015 604/175 |
| 5,188,140 | A * | 2/1993 | Kosaka | B60K 15/03519 137/12 |
| 5,401,255 | A * | 3/1995 | Sutherland | A61M 39/24 604/247 |
| 6,364,145 | B1 * | 4/2002 | Shaw | B60K 15/035 220/203.11 |
| RE37,776 | E * | 7/2002 | Foltz | B60K 15/04 141/325 |
| 7,013,896 | B2 * | 3/2006 | Schmidt | A61M 16/06 128/203.29 |
| 7,201,165 | B2 * | 4/2007 | Bruce | A61M 15/0086 128/200.23 |
| 9,492,779 | B2 | 11/2016 | Yi | |
| 2002/0121531 | A1 * | 9/2002 | Stillinger | B65D 47/2025 222/525 |

(Continued)

*Primary Examiner* — Kareen Thomas
(74) *Attorney, Agent, or Firm* — Andrew W. Chu; Craft Chu PLLC

(57) ABSTRACT

The mechanical breather valve includes a valve body, on which is installed one-way air inlet and outlet components. A tank, for environmental protection, is fitted with the breather valve and closed so that no volatile gas will be exhausted, when the pressure within is balanced with the outside. When the pressure within is negative, the one-way air inlet hole will draw air from outside to keep the balance of pressure. When the pressure within is increased, one-way air outlet hole will exhaust the additional air. When the tank is tilted or placed upside down, the breather valve can prevent the oil from flowing out of the tank for safe usage.

13 Claims, 4 Drawing Sheets

(56) References Cited

U.S. PATENT DOCUMENTS

| | | | | |
|---|---|---|---|---|
| 2002/0166864 A1* | 11/2002 | Stillinger | ............... | C11C 5/00 |
| | | | | 220/600 |
| 2005/0145284 A1* | 7/2005 | Sarajian | ............... | F16K 15/148 |
| | | | | 137/854 |
| 2007/0051724 A1* | 3/2007 | DeCapua | ............ | B60K 15/0406 |
| | | | | 220/203.28 |
| 2011/0114677 A1* | 5/2011 | Kessell | ............... | B65D 47/30 |
| | | | | 222/507 |
| 2014/0326742 A1* | 11/2014 | Dunkle | ............ | B60K 15/03504 |
| | | | | 220/746 |
| 2016/0243489 A1 | 8/2016 | Yi | | |
| 2016/0272064 A1 | 9/2016 | Yi | | |

* cited by examiner

A'-A'

BREATHER VALVE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention involves a kind of breather valve, specifically for a tank cap, health care instruments and petrochemical equipment in order to keep a pressure balance on both sides of the valve.

2. Description of Related Art Including Information Disclosed Under 37 CFR 1.97 and 37 CFR 1.98

So far, the relief valve is widely used on equipment for balancing the inner pressure, such as inner pressure of a tank. The tank cap of gasoline engines and diesel motors all adopt toner and absorbing foam to prevent gasoline or diesel from leaking. However, the relief valve turns out to be less desirable because a large amount of gas is exhausted directly to the atmospheric environment and causes pollution. Specifically, the occurrence of vibration, tilting, or even conversion, when the engine runs, will cause outflow of a large amount of gas and gasoline, which leads to severe pollution of the air and environment, harm to people's health and can even cause death traps such as spontaneous combustion.

BRIEF SUMMARY OF THE INVENTION

This invention is created for addressing a technical issue, that is to provide a tank cap with a breather valve, which balances the pressure inside of the tank sealed by the tank cap, and at the same time, keeps gas and gasoline from overflowing so as to assure safe use.

Here are technical plans for solving the problem: a kind of breather valve with one-way air inlet and outlet parts, which are built on the valve body.

The one-way air inlet and outlet parts are made of elastic materials, which will open a respective flowing passage when the pressure of either side becomes unbalanced.

The beneficial effect generated from this invention is to achieve environmental protection and safe use. The tank cap with a breather valve can prevent gasoline overflowing out of the tank and gas from being exhausted or leaking, when the tank is be placed upside down. When pressure becomes low, the one-way air inlet hole will be opened to balance the pressure and preventing gasoline from overflowing or leaking out of the tank. When the pressure increases, such as when temperature rises, a large amount of gas can be vented. The one-way air outlet hole will exhaust gas until the pressure becomes balanced so as to keep tank from breaking.

Furthermore, the parts are elastic. The elastic slice or cutting joint goes through two sides of the valve body.

The benefits include plain structure, low cost, being safe to use and high quality. The elastic slice or cutting joint is made of elastic materials. Only when the pressure on two sides of the valve body differentiate to a certain level will the cutting joint open in order to increase or decrease the pressure in the tank. Normally, cutting joint is closed.

The elastic slice or cutting joint is integrated with the valve body.

The benefit includes convenient integration into processing and decreases in usage errors.

There is a groove made of elastic materials and having a groove cutting joint. The benefit for includes the bottom of groove having a large surface area and the groove cutting joint being thin. Thus, it is easy for conditioning the pressure according to the pressure inside and outside. The depth of groove needs to be designed according to the thickness of the valve body and the characteristics of elastic materials.

The groove presents a curved surface, such that the large surface area of the curved shape will increase the stress, making it easy for the groove cutting joint to be a one-way air inlet to condition the pressure, while keeping a good transition and good result from the operation of the breather valve.

A bulging part is elastic and placed on the valve body. The bulging part is hollow. The cutting joint acts as a hole linking the two sides of the valve body and hollow bulging part. The cutting joint is on top or on a side of the bulging part, linking to the hollow bulging part to the other side of the valve body.

The benefit includes the bulging part being deformed in its sides and being returned to fitted after exhausting gas.

Hence, the bulging part can easily become a pressure inlet or outlet. The whole structure is plain and well-functioning.

The bulging part is in the shape of a wedge.

The benefit is that the wedge shape makes the bulging part more reliable and will achieve a better function.

The bulging part is integrated with the valve body.

The benefit is that this integrated structure is simple with better unity and more reliable function.

The one-way air inlet and outlet is a combination of the groove cutting joint or the bulging part with cutting joint or of both.

The benefit is that the cutting joint is either the one-way air outlet or the one-way air inlet so that the groove and groove cutting joint can be on only the other side of the valve body. Each side of the valve body has a cutting joint or a groove cutting joint.

In a similar way, one-way air inlet and outlet can be made into the bulging part for it possesses the feature of one-way air inlet or outlet. Thus, a bulging part can be installed on each side of two sides with respective cutting joints as either the one-way air inlet or outlet.

Besides, the elastic slice or cutting joint and bulging part can be combined for usage. When the elastic slice or cutting joint works for gas exhaustion, the bulging part can be used for pressure increasing on the gas inlet. Then, the bulging part should be placed towards the inside of tank, and the elastic slice or cutting joint and bulging part in the same side of the valve body. On the contrary, the elastic slice or cutting joint and bulging part should be placed on the same side of the valve body, but the bulging part should now be placed towards the direction of gas exhaustion of the tank cap.

Furthermore, the valve body is in shape of circular panel. The ring bulging part can be installed on the end of one side of the valve body.

The benefit is that the circular panel shape is convenient for design and assembling. The ring bulging assembling is more convenient for installment and usage.

The ring bulging assembling is integrated with the valve body.

The benefit is the structure of integration is good function, which is simple for manufacturing a firm and reliable structure.

Furthermore, the ring bulging assembling is installed at the edge or border of the valve body.

The benefit is that the ring bulging assembling is flexible for installation placement and design.

A tank cap includes a breather valve for according to one of the technical plans above.

A tank includes a tank cap according to one of the technical plans above.

1. Valve body; 2. cutting joint; 3: groove cutting joint; 4: bulging assembling; 5: bulging part; 6: hollow space; 7: groove.

DETAILED DESCRIPTION OF THE INVENTION

Following is the description for principles and features of this invention on the basis of figures. All examples are only used for explaining this invention.

Executing Example 1

Figure 1:
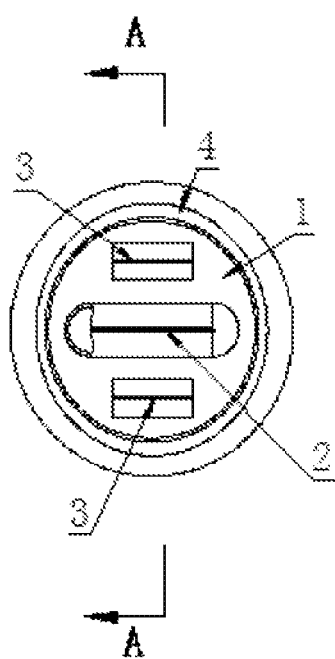
FIG. 1 is a front elevation view of the breather valve in executing example I.
Figure 2:
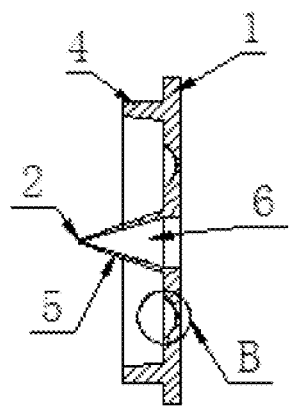
FIG. 2 is a sectional view across line A-A in FIG. 1.
Figure 3:
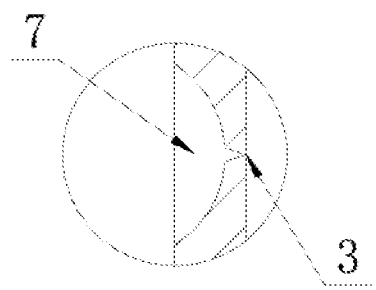
FIG. 3 is an enlarged and isolated sectional view of section B in FIG. 2.
Figure 4:
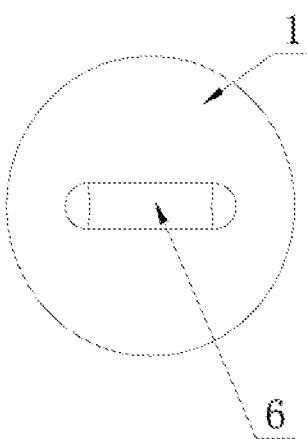
FIG. 4 is a back elevation view of FIG. 1.
Figure 5:
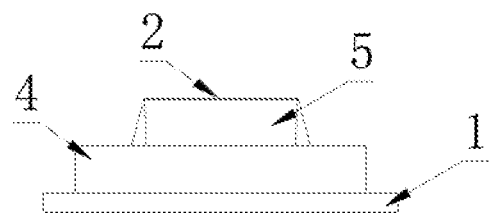
FIG. 5 top plan view of FIG. 1.

In FIG. 1 and FIG. 5, a breather valve can be used in a tank cap. The breather valve includes the valve body 1 that is made of elastic materials. Valve body 1 is in a shape of a circular panel. On an end closer to an edge, a ring bulging assembling 4 can be placed. Here, the elastic material commonly refers to rubber material.

On one side of the valve body 1, a bulging part 5 is installed as the air inlet. The one side faces the inside of tank, after installment of the breather valve.

The bulging part is in the shape of wedge that is integrated with the valve body 1 and possesses hollow space 6. On the valve body 1, the cutting joint 2 is the hole that goes throughout two sides of the valve body 1 and links to the air outside on one side of the valve body with the hollow space 6. Cutting joint 2 is on the top of bulging part 5. When the pressure on the side of valve body 1 installed with bulging part 5 is lower than the other side, the incision or cutting part 5 will open. On the contrary, the side of the valve body 1 with the cutting joint or incision 2 in shape of wedge will be squeezed and fitted after extrusion under the effect of differential pressure so that to realize the function of one-way air inlet.

There are two grooves 7 on sides of valve body 1. The grooves 7 and the bulging part 5 are on the same side of valve body 1. Each bottom of grooves 7 is curvy, or each bottom of grooves 7 has the groove cutting joint that goes throughout the two sides of valve body 1. The bottom surface of grooves is large so that it can burden a larger weight and is convenient for one-way pressure decreasing. Besides, the thickness of grooves possesses good transitivity that makes a good operation. The depth of groove should be considered according to the demand and the field it uses to achieving the flexibility and elastic material choosing.

Two grooves 7 are placed on two sides of bulging part 5, which is only limited for this execution example. Technical persons in charge of this field can set one or more than 2 to meet the demand for satisfying pressure exhaustion. Similarly, the bulging part 5 also could be designed as more than one bulging part. Both the placement of bulging part 5 and groove 7 can be put in different places to meet the demand.

Execution Example 2

Figure 6:
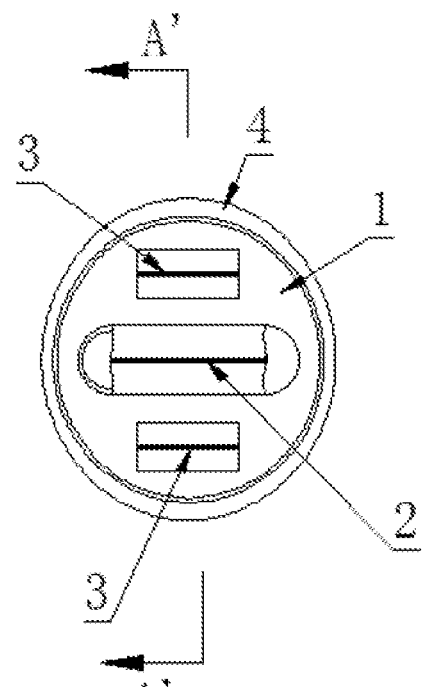
FIG. 6 is a front elevation view of the structure of a breather valve in executing example II.
Figure 7:
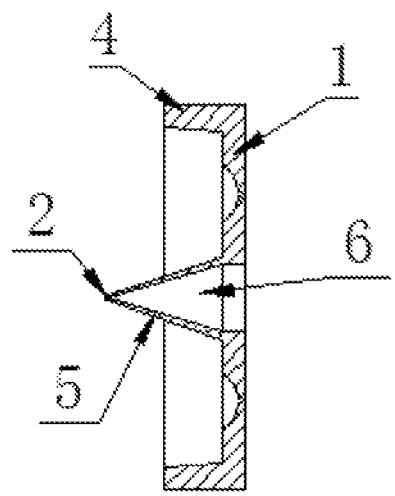
FIG. 7 is a sectional view across line A'-A' in FIG. 6.
Figure 8:
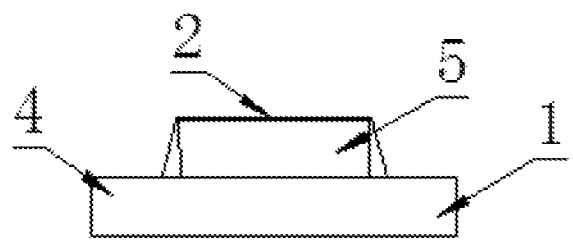
FIG. 8 is a top plan view of FIG. 6.

As shown on FIG. 6 and FIG. 8, the only difference is the placement of the bulging assembling 4. In real usage, the bulging assembling 4 can be arranged and placed as required.

The tank cap installed with the breather valve mentioned above, should assure air tightness during operation so to prevent the gasoline from venting into the air, which will lead to pollution when the pressure is unbalanced. Incision or cutting joint 2 and groove cutting joint 3 are each closed to avoid leaking when the tank tilted or upside down due to severe vibration or being bumped during operation. Even being tilted or being placed upside down for a long time, which can cause the cutting joint to open when the pressure inside of tank increases, active carbon can absorb little leaking oil for safety and avoid the risk derived from leaking.

Two execution examples mentioned above are only limited to illustration of structure and principle of breather valve. The bulging part of the breather valve and groove cutting joint in each groove 7 could be set as required. For example: the cutting joint 2 and bulging part 5 are not limited to being integral with the valve body 1. The valve body 1 can also have a hole for installment of an insert to place the bulging part and cutting joint 2.

Additionally, groove 7 and bulging part 5 can both be combined and separated. For example: the one-way air inlet on valve body 1 can be a groove, and the one-way air outlet on the valve body 1 can also be a groove, only assuring that these grooves are be placed on different sides of the two sides of the valve body.

One-way air inlet and the one-way air outlet can also both be bulging parts 5 mentioned above. The bulging part 5 possesses the feature of a one-way air inlet. Thus, bulging parts can be placed on different sides of two sides of the elastic valve body as the one-way air inlet and one-way air outlet.

Moreover, when groove 7 exhausts gas to decrease pressure and the bulging part 5 inhales air to increase pressure, the bulging part should be placed towards the inside of tank, and the groove 7 on elastic slice and bulging part 5 should be on the same side of valve body. This structure is the same as the execution example 1.

Each cutting joint or "elastic slice" can also serve for pressure increasing and bulging part for pressure decreasing. Both the cutting joint 2 and bulging part 5 should be placed on the same side of the valve body, and the bulging part 5 should be put toward the direction of exhaustion, which is on top of the tank.

And another thing needs to be claimed is that breather valve is not limited to a tank, but also for devices in health care and gasoline equipment for petrochemical industry. All things mentioned above are some good execution examples of this invention, but no limited to the version. Under the spirit and within the principle of this invention, any amendment, replacement and revision is included in the scope of this invention.

I claim:

1. A breather valve, comprising:
   a valve body;
   a plurality of one-way air inlet and outlet components installed on said valve body, the components opening when pressure balances two sides of said valve body, wherein a flow passage in said valve body is comprised of elastic materials; and
   a cutting joint being elastic and being placed on said valve body, said cutting joint extending through both sides of said valve body.

2. The breather valve, according to claim 1, further comprising a groove, said cutting joint being a groove cutting joint within said groove.

3. The breather valve, according to claim 1, further comprising a groove, said cutting joint being a groove cutting joint and laying on said groove.

4. The breather valve, according to claim 3, wherein said groove has a curved surface.

5. The breather valve, according to claim 1, further comprising: a bulging part being hollow, so as to form a hollow space and having a hole on said valve body extending through the two sides of said valve body, wherein said cutting joint forms said hole of said bulging part linking said hollow space to the two sides of said valve body.

6. The breather valve, according to claim 5, wherein said bulging part is shaped as a wedge.

7. The breather valve, according to claim 6, wherein said bulging part is made integral with said valve body.

8. The breather valves, according to claim 5, wherein at least one of the one-way air inlet and outlet components is comprised of said bulging part, and wherein at least another of the one-way air inlet and outlet components is comprised of a groove having a respective groove cutting joint.

9. The breather valve, according to claim 1, wherein said valve body is comprised of a circular slab, and wherein a ring bulging part is set on one end of said valve body.

10. The breather valve, according to claim 9, wherein said bulging part is installed integral with said valve body.

11. The breather valve, according to claim 9, wherein said bulging part is installed on an edge of said valve body.

12. A tank cap, comprising:
    a breather valve, according to claim 1; and
    a cap body.

13. A tank, comprising:
    a tank cap according to claim 12; and
    a tank body.

* * * * *